United States Patent
Huang et al.

(10) Patent No.: US 10,239,775 B2
(45) Date of Patent: Mar. 26, 2019

(54) APPARATUS FOR RELIEVING SURFACE-LAYER CLOGGING OF DENITRIFICATION DEEP-BED FILTER AND METHOD FOR RUNNING THE SAME

(71) Applicant: NANJING UNIVERSITY, Nanjing (CN)

(72) Inventors: Hui Huang, Nanjing (CN); Qing Wang, Nanjing (CN); Hong-qiang Ren, Nanjing (CN); Si-Jia Ma, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 15/632,357

(22) Filed: Jun. 25, 2017

(65) Prior Publication Data
US 2018/0099887 A1    Apr. 12, 2018

(30) Foreign Application Priority Data
Oct. 12, 2016  (CN) .......................... 2016 1 0892699

(51) Int. Cl.
| C02F 3/30 | (2006.01) |
| C02F 1/00 | (2006.01) |
| C02F 3/06 | (2006.01) |
| C02F 3/12 | (2006.01) |
| C02F 3/00 | (2006.01) |

(52) U.S. Cl.
CPC .............. *C02F 3/302* (2013.01); *C02F 1/001* (2013.01); *C02F 3/06* (2013.01); *C02F 3/12* (2013.01); *C02F 3/00* (2013.01); *C02F 2301/00* (2013.01); *Y02E 50/343* (2013.01); *Y02W 10/15* (2015.05)

(58) Field of Classification Search
CPC .. C02F 3/302; C02F 3/06; C02F 1/001; C02F 3/12; C02F 3/00; C02F 2301/00; Y02E 50/343
USPC ........ 210/617, 631, 150, 151, 205, 206, 903
See application file for complete search history.

(56) References Cited

U.S. PATENT DOCUMENTS

| 5,306,422 A * | 4/1994 | Krofta | ................ B01D 21/0045 210/151 |
| 2015/0101967 A1* | 4/2015 | Thomson | ................ C02F 3/282 210/96.1 |
| 2015/0353397 A1* | 12/2015 | Cath | ....................... C02F 3/308 210/195.1 |

FOREIGN PATENT DOCUMENTS

DE    4221867 A1 *  1/1994

* cited by examiner

*Primary Examiner* — Fred Prince
(74) *Attorney, Agent, or Firm* — W&K IP

(57) ABSTRACT

The invention discloses an apparatus for relieving surface-layer clogging of a denitrification deep-bed filter and a method for running the same, which belongs to the field of sewage treatment.

12 Claims, 1 Drawing Sheet

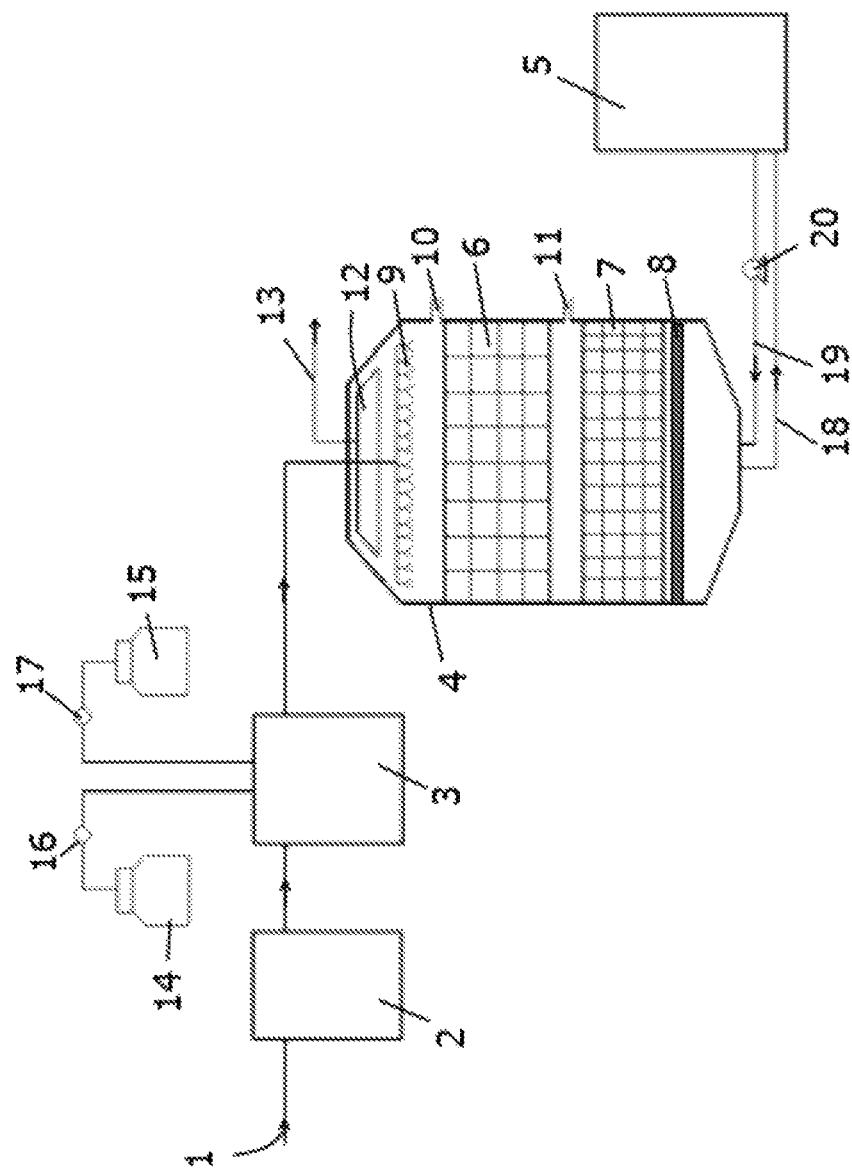

APPARATUS FOR RELIEVING SURFACE-LAYER CLOGGING OF DENITRIFICATION DEEP-BED FILTER AND METHOD FOR RUNNING THE SAME

CROSS-REFERENCE TO RELATED APPLICATIONS

This application claims priority to Chinese Patent Application No. 201610892699.6 with a filing date of Oct. 12, 2016. The content of the aforementioned applications, including any intervening amendments thereto, are incorporated herein by reference.

TECHNICAL FIELD

The invention relates to the technical field of sewage treatment, and in particular to an apparatus for relieving surface-layer clogging of a denitrification deep-bed filter and a method for running the same.

BACKGROUND OF THE PRESENT INVENTION

Currently the secondary effluent of a sewage treatment plant often contains a certain amount of nitrate nitrogen, phosphorus and suspended solids, which can cause excessive accumulation of nutrients in a water body when directly discharged into rivers and lakes, and even more cause water bloom and the like. The national environmental protection department require urban sewage treatment plants to strictly obey a first-grade A standard as specified in the "pollutant discharge standards for urban sewage treatment plants" (GB18918-2002), which applies a higher requirement on the treated effluent of sewage treatment plants. Therefore, it is of urgent need to technically reform and upgrade the existing sewage treatment plant, so as to remove nitrate and suspended solids from the secondary effluent.

The denitrification deep-bed filter is sewage advanced treatment unit which integrates denitrification biological nitrogen removal function and filtering function as a whole, having a simple filter body structure, a low running cost, and convenient operation management. The working principle of the apparatus is that, when the sewage flows through a filtering material contained within the filter under the action of gravity, a biomembrane adhered on the filtering material reduces nitrite and nitrate into nitrogen gas under an anaerobic condition; and meanwhile under the physical interception and absorption actions of the filtering material, the suspended solids contained in the inlet water are also removed. The sewage entering the denitrification deep-bed filter is generally sewage treated through secondary biochemical treatment, which has a low COD, but most denitrifying bacteria are heterotrophic bacteria, such that for ensuring high-effective running of the filter, it needs to add a certain amount of carbon source to achieve the purpose of high-effective nitrogen removal.

Since generally dissolved oxygen (DO) is presented in secondary effluent, and the heterotrophic bacteria on the surface layer of the filtering material consumes the DO by using the carbon sources contained in the inlet water, the heterotrophic bacteria on the surface layer of the filter have a mass reproduction, which decreases the gap of the upper-layer filtering material; meanwhile due to the suspended solids as intercepted on the surface layer of the filtering material, under coaction of the gap decrease and the suspended solids, a "mud blanket" phenomenon occurs in the surface layer of the filtering material in a short period, and thus the resistance of the filter bed is increased dramatically and the treatment capacity is decreased rapidly.

To ensure treatment efficiency and reduce the cost, most of the existing method starts with strict control of the dosage of the carbon source and the separation aspect in the functions of the filter. For example, Chinese patent No. 201320039384.9, which is published at Jul. 17, 2013, discloses a patent application document named "combined-type deep-bed denitrification nitrogen-removal filter", the invention disclosed in the document relates to a combined-type deep-bed denitrification nitrogen-removal filter, which is provided with a filter, a clean water tank, a carbon-source dosing system and a sewage tank, and the filter is also provided with a denitrification bio-bed, a quartz sand filter bed, a supporting layer, and a gas-water mixing region formed by W filter bricks. The denitrification bio-bed adopts a combination of a natural beehive-shape volcanic-rock filling material with high porosity and a quartz sand filtering material, to complete the nitrogen removal and removal of suspended matters in multiple steps. Chinese patent No. 201410140512.8, which is published at Apr. 9, 2014, discloses a patent application document named "Intelligent and Precise Carbon-Source Dosing System for Denitrification Deep-Bed Filter", the invention disclosed in the document relates to an intelligent and precise carbon-source dosing system for a denitrification deep-bed filter, which is provided with a water inlet, a COD inlet water detector, a dosing meter pump, an inlet water meter pump, a central control system, a dissolved oxygen meter, a pH meter, a thermometer, a denitrification deep-bed filter, a COD outlet water detector, a water outlet, and a nitrate analyzer of the water outlet and inlet, wherein the carbon-source dosage is controlled through the central control system according to the collected COD, flow rate, DO, temperature and pH value signal. The aforementioned patents relieve the problem of clogging the surface layer of the filter via the separating function of the filter and precise dosing of the carbon source, but do not reduce the surface-layer clogging of the filtering material due to mass reproduction of heterotrophic bacteria as caused by the fact that heterotrophic bacteria consume the DO by using the carbon source, or due to the interception of suspended matters.

SUMMARY OF PRESENT INVENTION

In view of the problem of surface-layer clogging of the filtering material due to mass reproduction of heterotrophic bacteria and the interception of suspended matters, the technical problem to be solved by the invention is providing an apparatus for relieving surface-layer clogging of a denitrification deep-bed filter and a method for running the same, which can effectively prolong the running cycle of the denitrification deep-bed filter, decrease the backwash times and reduce the dosage of the carbon source on the premise that the SS and total nitrogen concentration of the outlet water is ensured to be constant or lower.

To solve the above-mentioned technical problems, the technical solution of the invention is as follows:

An apparatus for relieving surface-layer clogging of a denitrification deep-bed filter, mainly comprising a settling tank, an adjusting tank, a denitrification deep-bed filter, a clean water tank, a first chemical storage tank, and a second chemical storage tank; the settling tank, the adjusting tank and the denitrification deep-bed filter are connected through tubes therebetween, the first chemical storage tank and the second chemical storage tank are respectively communicated into the adjusting tank through tubes, a first control valve is arranged on the tube between the first chemical storage tank and the adjusting tank, a second control valve is arranged on the tube between the second chemical storage tank and the adjusting tank, the denitrification deep-bed filter is provided with a gas collecting device, an uniform water distributor, a first filling material layer, a second filling material layer, and an electrodialysis membrane sequentially from up to down, a certain distance is arranged between the first filling material layer and the second filling material layer and between the second filling material layer and the electrodialysis membrane, the bottom end of the denitrification deep-bed filter is connected with the clean water tank through a treated-water discharging pipe, the backwash pump is arranged between the clean water tank and the bottom end of the denitrification deep-bed filter through a backwash pipe; a mixed solution of sodium acetate and methanol with a molar ratio thereof of 3:2 is filled in the first chemical storage tank; and a rhamnolipid solution with a mass concentration of 30-40% is filled in the second chemical storage tank.

Furthermore, in the aforementioned technical solution, a first outlet of backwash water and a second outlet of backwash water are arranged above the first filling material layer and the second filling material layer respectively.

Furthermore, in the aforementioned technical solution, the uniform water distributor consists of fractionation water distributing devices respectively comprising a water inlet manifold, a main pipe, a branch pipe and a water distributor having uniformly-arranged water distributing holes.

Furthermore, in the aforementioned technical solution, the first filling material layer is zeolite with a selected particle size of 7-8 mm and a density of 2.0-2.4 g/cm$^3$.

Furthermore, in the aforementioned technical solution, the second filling material layer consists of quartz sand with a selected particle size of 2-4 mm.

Furthermore, in the aforementioned technical solution, the electrodialysis membrane consists of an anion exchange membrane and a cation exchange membrane, wherein the anion exchange membrane includes the following components by weight: 60-80 parts of anion-exchange resin powder, 14-30 parts of adhesive, 1.1-2.6 parts of releasing agent, 0.05-0.1 parts of activating agent; the cation exchange membrane mainly comprises the following components by weight: 55-72 parts of cation-exchange resin powder, and the remaining components are the same as those of the anion exchange membrane; the adhesive is polyethylene, the releasing agent is calcium stearate, the antioxidant is microcrystalline wax 517P, and the activating agent is a mixture of polyethylene glycol, zinc oxide and stearic acid with a mass ratio of 1-1.2:4-9:1-2.3; a method for preparing the anion exchange membranes: drying the anion-exchange resin powder at a temperature of 60-70° C.; grinding the dried powder in a nanon ball-mill till 500-800 nm; adding the adhesive, the releasing agent, the antioxidant, and the activating agent and stirring them uniformly; placing them into a double roller mixer to perform mixing at a temperature of 124-130° C.; pulling the mixture on a flattener into a membrane sheet with a desired thickness; and then covering two membrane sheets respectively on both top and bottom sides of one membrane sheet, and feeding them into a thermocompressor to perform hot-pressing, so as to obtain the electroosmosis anion exchange membrane; and the preparation method of the cation exchange membrane is the same as that of the anion exchange membrane.

A method for running the apparatus for relieving surface-layer clogging of a denitrification deep-bed filter, includes steps of:

A) introducing sewage to be treated from a raw-water inlet into a settling tank to perform preliminary sedimentation, then introducing into an adjusting tank, and opening a first control valve to add a mixed solution of sodium acetate and methanol into the adjusting tank through a first chemical storage tank in such a manner that the COD/N of the inlet water is equal to 3-5;

B) passing a water flow into a first filling material layer within a denitrification deep-bed filter via a uniform water distributor, such that suspended solids with large particle sizes in the inlet water is removed under the absorption and interception actions of zeolite, and meanwhile a small amount of ammonia nitrogen contained in the inlet water is also removed through absorption, and thus the suspended solids with large particle sizes and parts of DO are removed;

C) continually passing the water flow through a second filling material layer within the denitrification deep-bed filter, wherein the water flow is absorbed and intercepted by the quartz sand filling material of the second filling material layer, and SS and nitrate are removed through the denitrification action of denitrifying bacteria, the denitrifying bacteria reduce nitrate and nitrite into nitrogen gas by using a carbon source contained in the inlet water, and the nitrogen gas is collected by a gas collecting device and discharged from a gas outlet; adjusting a first control valve to reduce the flow rate of the mixed solution of sodium acetate and methanol to 30-45% of the initial flow rate when the filtration rate of the filter is reduced and become stable; and then adjusting the flow rate via the first control valve when the filtration rate of the filter become lower than 50-65% of the designed filtration rate;

D) continually passing the water flow through an electrodialysis membrane, wherein the electrodialysis membrane absorbs water and swells after an external power supply is applied thereto, so as to absorb and separate electrolytes contained in the water;

E) opening a second control valve and adding a rhamnolipid solution in such a manner that the mass concentration of rhamnolipid within the inlet water is 60-80 mg/L, and running the denitrification deep-bed filter to perform dispersion and separation of the substances intercepted in the surface layer of the filtering material within the filter; wherein the running time of this step is determined by the filtering-rate recovery time of the filter, and adjusting the flow rate of the second control valve when the filtration rate of the filter is increased to a stable level; wherein the rhamnolipid solution can facilitate dispersion of extracellular polymeric substance of microorganisms and suspended matters, decrease the particle size, break the "mud blanket" which clogs the surface layer of the filter, and meanwhile may be degraded as a carbon source of microorganisms;

F) adjusting the second control valve in such a manner that the flow rate of the rhamnolipid solution become 30-50% of the flow rate of step C when the filtration rate of the filter is increased and become stable, adjusting the first control valve in such a manner that the flow rate of the mixed solution of sodium acetate and methanol become 60-70% of the flow rate of step A, and then continually running the filter to complete the dispersion of the substances intercepted in the surface layer of the filtering material within the filter; and then adjusting the flow rate of the first control valve in such a manner that the COD of the outlet water of the filter is less than or equal to the COD of the outlet water before adjusting the first control valve; and G) starting a backwash pump when the concentration of suspended solids in the outlet water is greater than 10 mg/L or the filtration rate is less than 60% of the designed filtration rate, wherein a portion of water contained in a clean water tank is used for backwash, and the backwash is divided into two phases, wherein in the first phase of backwashing the second filling material layer, a first outlet of backwash water is closed and a second outlet of backwash water is open, such that the backwash water flows out from the second outlet of backwash water; and in the second phase of backwashing the first filling material layer, the second outlet of backwash water is closed and the first outlet of backwash water is open, such that the backwash water flows out from the first outlet of backwash water.

When rhamnolipid is added into the inlet water, the suspended matters contained in the inlet water is dispersed into suspended matters with small particle sizes under the solubilizing action of rhamnolipid, and at the same time the biodegradable COD in the inlet water is increased. When the rhamnolipid solution enters the surface layer of the filtering material, under its action the suspended matters and extracellular polymeric substance of microorganisms as intercepted by the surface layer of the filtering material are dispersed, and in turn the floc structure formed by the microorganisms is broken, thereby increasing the porosity of the surface layer of the filtering material. The dispersed microorganisms and suspended matters are intercepted when flow into a lower-layer filtering material along with the water flow, thereby achieving an excellent effect of deeply intercepting suspended matters in the filtering material, while ensuring the water quality of the outlet water. When the filtration rate of the filter is decreased to 50-65% of the initial filtration rate, rhamnolipid is added into the adjusting tank in such a manner that the concentration of rhamnolipid is 60-80 mg/L, and after running for 6-7 days, it can recover the filtration rate of the filter to 86-89% of the initial filtration rate, and the time point of the first backwash of the filter is delayed from day 16-19 to day 29-32.

The beneficial effect of the invention is:

(1) The biodegradable and environment-friendly biosurfactant rhamnolipid added into the apparatus of the invention can effectively disperse suspended matters contained in the inlet water, decrease the particle size of suspended matters, and increase the content of biodegradable COD in the raw water, thereby decreasing externally added carbon sources while reducing the possibility of surface-layer clogging of the filtering material of the filter as caused by the suspended matters.

(2) In the invention the added rhamnolipid can effectively solubilize the extracellular polymeric substance of microorganisms, break the "mud blanket" consisting of microorganisms and suspended matters on the surface layer of the filtering material, and disperse the surface-layer "mud blanket" into particles with smaller particle sizes, such that the particles flow into a lower-layer filtering material along with the water flow, thereby achieving an excellent effect of deeply intercepting suspended matters in the filtering material.

(3) In the invention the added rhamnolipid can effectively improve the porosity of the filtering material, which can not only perform denitrification nitrogen-removal with high efficiency but also acts as a filter, such that the working cycle of the filter is prolonged, the backwash times are reduced, the dosage of externally added carbon sources is reduced, the cost of technology transformation is low since only a second dosing system is added on the basis of the original filter, the operation and running management are convenient, the inlet water has a high water quality, and the constructing and running cost is low.

(4) In the invention an electrodialysis membrane is provided to further absorb the pollutants contained in the water by means of its water-absorbing and swelling action upon powered on, which greatly improves the water quality of the outlet water.

DESCRIPTION OF THE DRAWINGS

FIG. 1 is a schematic structure view of the invention; wherein, 1—raw-water inlet, 2—settling tank, 3—adjusting tank, 4—reactor body, 5—clean water tank, 6—first filling material layer, 7—second filling material layer, 8—electrodialysis membrane, 9—uniform water distributor, 10—first outlet of backwash water, 11—second outlet of backwash water, 12—gas collecting device, 13—gas outlet, 14—first chemical storage tank, 15—second chemical storage tank, 16—first control valve, 17—second control valve, 18—treated-water discharging pipe, 19—backwash water pipe, and 20—backwash pump.

DETAILED DESCRIPTION OF PREFERRED EMBODIMENTS

For further understanding the disclosure of the invention, the invention will be further described in details in connection with embodiments.

Example 1

As shown in FIG. 1, an apparatus for relieving surface-layer clogging of a denitrification deep-bed filter, mainly includes a settling tank 2, an adjusting tank 3, a denitrification deep-bed filter 4, a clean water tank 5, a first chemical storage tank 14, and a second chemical storage tank 15; the settling tank 2, the adjusting tank 3 and the denitrification deep-bed, filter 4 are connected through tubes therebetween, the first chemical storage tank 14 and the second chemical storage tank 15 are respectively communicated into the adjusting tank 3 through tubes, a first control valve 16 is arranged on the tube between the first chemical storage tank 14 and the adjusting tank 3, a second control valve 17 is arranged on the tube between the second chemical storage tank 15 and the adjusting tank 3, the denitrification deep-bed filter 14 is provided with a gas collecting device 12, an uniform water distributor 9, a first filling material layer 6, a second filling, material layer 7, and an electrodialysis membrane 8 sequentially from up to down, a certain distance is arranged between the first filling material layer 6 and the second filling material layer 7 and between the second filling material layer 7 and the electrodialysis membrane 8; a first outlet of backwash water 10 and a second outlet of backwash water 11 are arranged above the first filling material layer 6 and the second filling material layer 7 respectively; the uniform water distributor 9 consists of fractionation water distributing devices respectively including a water inlet manifold, a main pipe, a branch pipe and a water distributor having uniformly-arranged water distributing holes; the bottom end of the denitrification deep-bed filter 4 is connected with the clean water tank 5 through a treated-water discharging pipe 18, the backwash pump 20 is arranged between the clean water tank 5 and the bottom end of the denitrification deep-bed filter 4 through a backwash pipe 19; a mixed solution of sodium acetate and methanol with a molar ratio thereof of 3:2 is filled in the first chemical storage tank 14;

and a rhamnolipid solution with a mass concentration of 30-40% is filled in the second chemical storage tank 15.

The first filling material layer 6 is zeolite with a selected particle size of 7 mm and a density of 2.0 g/cm$^3$. The second filling material layer 7 consists of quartz sand with a selected particle size of 2 mm. the electrodialysis membrane 8 consists of an anion exchange membrane and a cation exchange membrane, wherein the anion exchange membrane includes the following components by weight: 60 parts of anion-exchange resin powder, 14 parts of adhesive, 1.1 parts of releasing agent, and 0.05 parts of activating agent. The cation exchange membrane mainly comprises the following components by weight: 55 parts of cation-exchange resin powder, and the remaining components are the same as those of the anion exchange membrane; the adhesive is polyethylene, the releasing agent is calcium stearate, the antioxidant is microcrystalline wax 517P, and the activating agent is a mixture of polyethylene glycol, zinc oxide and stearic acid with a mass ratio of 1:4:1; a method for preparing the anion exchange membrane is: drying the anion-exchange resin powder at a temperature of 60° C.; grinding the dried powder in a nanon ball-mill till 500 nm; adding the adhesive, the releasing agent, the antioxidant, and the activating agent and stirring them uniformly; placing them into a double roller mixer to perform mixing at a temperature of 124° C.; pulling the mixture on a flattener into a membrane sheet with a desired thickness; and then covering two membrane sheets respectively on both top and bottom sides of one membrane sheet, and feeding them into a thermocompressor to perform hot-pressing, so as to obtain the electroosmosis anion exchange membrane; and the preparation method of the cation exchange membrane is the same as that of the anion exchange membrane.

A method for running the apparatus for relieving surface-layer clogging of a denitrification deep-bed filter, includes steps of:

A) introducing sewage to be treated from a raw-water inlet 1 into a settling tank 2 to perform preliminary sedimentation, then introducing into an adjusting tank 3, and opening a first control valve 16 to add a mixed solution of sodium acetate and methanol into the adjusting tank 3 through a first chemical storage tank 14 in such a manner that the COD/N of the inlet water is equal to 3-5;

B) passing a water flow into a first filling material layer 6 within a denitrification deep-bed filter 4 via a uniform water distributor 5, such that suspended solids with large particle sizes in the inlet water is removed under the absorption and interception actions of zeolite, and meanwhile a small amount of ammonia nitrogen contained in the inlet water is also removed through absorption, and thus the suspended solids with large particle sizes and parts of DO are removed;

C) continually passing the water flow through a second filling material layer 7 within the denitrification deep-bed filter 4, wherein the water flow is absorbed and intercepted by the quartz sand filling material of the second filling material layer 7, and SS and nitrate are removed through the denitrification action of denitrifying bacteria, the denitrifying bacteria reduce nitrate and nitrite into nitrogen gas by using a carbon source contained in the inlet water, and the nitrogen gas is collected by a gas collecting device 12 and discharged from a gas outlet 13; adjusting a first control valve 16 to reduce the flow rate of the mixed solution of sodium acetate and methanol to 30-45% of the initial flow rate when the filtration rate of the filter is reduced and become stable; and then adjusting the flow rate via the first control valve 16 when the filtration rate of the filter become lower than 50-65% of the designed filtration rate;

D) continually passing the water flow through an electrodialysis membrane, wherein the electrodialysis membrane (8) absorbs water and swells after an external power supply is applied thereto, so as to absorb and separate electrolytes contained in the water;

E) opening a second control valve 17 and adding a rhamnolipid solution in such a manner that the mass concentration of rhamnolipid within the inlet water is 60-80 mg/L, and running the denitrification deep-bed filter to perform dispersion and separation of the substances intercepted in the surface layer of the filtering material within the filter; wherein the running time of this step is determined by the filtering-rate recovery time of the filter, and adjusting the flow rate of the second control valve 17 when the filtration rate of the filter is increased to a stable level; wherein the rhamnolipid solution can facilitate dispersion of extracellular polymeric substance of microorganisms and suspended matters, decrease the particle size, break the "mud blanket" which clogs the surface layer of the filter, and meanwhile may be degraded as a carbon source of microorganisms;

F) adjusting the second control valve (17) in such a manner that the flow rate of the rhamnolipid solution become 30-50% of the flow rate of step C when the filtration rate of the filter is increased and become stable, adjusting the first control valve (16) in such a manner that the flow rate of the mixed solution of sodium acetate and methanol become 60-70% of the flow rate of step A, and then continually running the filter to complete the dispersion of the substances intercepted in the surface layer of the filtering material within the filter; and then adjusting the flow rate of the first control valve (16) in such a manner that the COD of the outlet water of the filter is less than or equal to the COD of the outlet water before adjusting the first control valve (16); and G) starting a backwash pump (20) when the concentration of suspended solids in the outlet water is greater than 10 mg/L or the filtration rate is less than 60% of the designed filtration rate, wherein a portion of water contained in a clean water tank (5) is used for backwash, and the backwash is divided into two phases, wherein in the first phase of backwashing the second filling material layer (7), a first outlet of backwash water (10) is closed and a second outlet of backwash water (11) is open, such that the backwash water flows out from the second outlet of backwash water (11); and in the second phase of backwashing the first filling material layer (6), the second outlet of backwash water (11) is closed and the first outlet of backwash water (10) is open, such that the backwash water flows out from the first outlet of backwash water (10).

Example 2

It is the same as Example 1, with the exception that the first filling material layer 6 is zeolite with a selected particle size of 7.5 mm and a density of 2.2 g/cm$^3$; the second filling material layer 7 consists of quartz sand with a particle size of 3 mm; the electrodialysis membrane 8 consists of an anion exchange membrane and a cation exchange membrane, wherein the anion exchange membrane includes the following components by weight: 70 parts of anion-exchange resin powder, 22 parts of adhesive, 1.85 parts of releasing agent, 0.075 parts of activating agent; the cation exchange membrane mainly includes the following components by weight: 58.5 parts of cation-exchange resin powder, and the remaining components are the same as those of the anion exchange membrane; the adhesive is polyethylene, the releasing agent is calcium stearate, the antioxidant is microcrystalline wax 517P, and the activating agent is a mixture of polyethylene glycol, zinc oxide and stearic acid with a mass ratio of 1.1:6.5:1.65; a method for preparing the anion exchange membranes: drying the anion-exchange resin powder at a temperature of 65° C.; grinding the dried powder in a nanon ball-mill till 650 nm; adding the adhesive, the releasing agent, the antioxidant, and the activating agent and stirring them uniformly; placing them into a double roller mixer to perform mixing at a temperature of 127° C.; pulling the mixture on a flattener into a membrane sheet with a desired thickness; and then covering two membrane sheets respectively on both top and bottom sides of one membrane sheet, and feeding them into a thermocompressor to perform hot-pressing, so as to obtain the electroosmosis anion exchange membrane; and the preparation method of the cation exchange membrane is the same as that of the anion exchange membrane.

When the filtration rate of the filter is decreased to 60% of the initial filtration rate, the second doser is opened to make the concentration of rhamnolipid become 70 mg/L, and at this time the flow rate of the first doser is adjusted to 40% of the initial flow rate. After running for 6 days, the filtration rate of the filter is recovered to 91% of the initial filtration rate and presents a stable trend, and in this period the removal rate of nitrate nitrogen is stabled between 83-88%, and the time point of the first backwash of the filter is delayed from day 17 to day 31. The changes of water quality of the inlet water: for the inlet water, the COD is 80-115 mg/L, TN is 20-26 mg/L, TP is 0.7-1.1 mg/L, SS is 19-31 mg/L, and NO3-N is 20-24 mg/L; and for the outlet water, the COD is 22-36 mg/L, TN is 2.6-4.5 mg/L, TP is 0.09-0.21 mg/L, SS is 2.3-3.9 mg/L, and NO—N is 0.9-1.6 mg/L.

Example 3

It is the same as Example 1, with the exception that the first filling material layer 6 is zeolite with a selected particle size of 8 mm and a density of 2.4 g/cm³. The second filling material layer 7 consists of quartz sand with a selected particle size of 4 mm. The electrodialysis membrane 8 consists of an anion exchange membrane and a cation exchange membrane, wherein the anion exchange membrane includes the following components by weight: 80 parts of anion-exchange resin powder, 30 parts of adhesive, 2.6 parts of releasing agent, and 0.1 parts of activating agent. The cation exchange membrane mainly comprises the following components by weight: 72 parts of cation-exchange resin powder, and the remaining components are the same as those of the anion exchange membrane; the adhesive is polyethylene, the releasing agent is calcium stearate, the antioxidant is microcrystalline wax 517P, and the activating agent is a mixture of polyethylene glycol, zinc oxide and stearic acid with a mass ratio of 1.2:9:2.3; a method for preparing the anion exchange membrane is: drying the anion-exchange resin powder at a temperature of 70° C.; grinding the dried powder in a nanon ball-mill till 800 nm; adding the adhesive, the releasing agent, the antioxidant, and the activating agent and stirring them uniformly; placing them into a double roller mixer to perform mixing at a temperature of 130° C.; pulling the mixture on a flattener into a membrane sheet with a desired thickness; and then covering two membrane sheets respectively on both top and bottom sides of one membrane sheet, and feeding them into a thermocompressor to perform hot-pressing, so as to obtain the electroosmosis anion exchange membrane; and the preparation method of the cation exchange membrane is the same as that of the anion exchange membrane.

When the filtration rate of the filter is decreased to 50% of the initial filtration rate, the second doser is opened to make the concentration of rhamnolipid become 80 mg/L, and at this time the flow rate of the first doser is adjusted to 30% of the initial flow rate. After running for 7 days, the filtration rate of the filter is recovered to 86% of the initial filtration rate and presents a stable trend, and in this period the removal rate of nitrate nitrogen is stabled between 81-84%, and the time point of the first backwash of the filter is delayed from day 19 to day 32. The changes of water quality of the inlet water: for the inlet water, the COD is 80-115 mg/L, TN is 20-26 mg/L, TP is 0.7-1.1 mg/L, SS is 19-31 mg/L, and NO3-N is 20-24 mg/L; and for the outlet water, the COD is 27-46 mg/L, TN is 2.7-4.4 mg/L, TP is 0.08-0.25 mg/L, SS is 3.3-5.9 mg/L, and NO—N is 0.87-1.54 mg/L.

The aforementioned description is only preferred embodiments of the invention, rather than limiting the invention, and any modification, equivalent substitution and improvement within the spirit and principle of the invention should be included in the protection scope of the invention.

OVERALL, The apparatus includes a settling tank, an adjusting tank, a denitrification deep-bed filter, a clean water tank, a first chemical storage tank, and a second chemical storage tank; the denitrification deep-bed filter is provided with a gas collecting device, a uniform water distributor, a first filling material layer, a second filling material layer, and an electrodialysis membrane sequentially from up to down; a certain distance is arranged between the first filling material layer and the second filling material layer and between the second filling material layer and the electrodialysis membrane; a mixed solution of sodium acetate and methanol is filled in the first chemical storage tank, and a rhamnolipid solution with a mass concentration of 30-40% is filled in the second chemical storage tank. Through the apparatus and processing method of the invention, solid impurities can penetrate the surface layer of the filter bed, achieving the effect of deeply intercepting suspended matters in the entire filter, prolonging the running cycle of the filter, reducing the backwash times; meanwhile reducing the dosage of carbon sources to further improve the water quality of the outlet water.

We claim:

1. An apparatus for relieving surface-layer clogging of a denitrification deep-bed filter, mainly comprising a settling tank (2), an adjusting tank (3), a denitrification deep-bed filter (4), a clean water tank (5), a first chemical storage tank (14), and a second chemical storage tank (15); the settling tank (2), the adjusting tank (3) and the denitrification deep-bed filter (4) are connected through tubes therebetween, the first chemical storage tank (14) and the second chemical storage tank (15) are respectively communicated into the adjusting tank (3) through tubes, a first control valve (16) is arranged on the tube between the first chemical storage tank (14) and the adjusting tank (3), a second control valve (17) is arranged on the tube between the second chemical storage tank (15) and the adjusting tank (3), the denitrification deep-bed filter (4) is provided with a gas collecting device (12), an uniform water distributor (9), a first filling material layer (6), a second filling material layer (7), and an electrodialysis membrane (8) sequentially from up to down, a certain distance is arranged between the first filling material layer (6) and the second filling material layer (7) and between the second filling material layer (7) and the electrodialysis membrane (8), the bottom end of the denitrification deep-bed filter (4) is connected with the clean water tank (5) through a treated-water discharging pipe (18), the backwash pump (20) is arranged between the clean water tank (5) and the bottom end of the denitrification deep-bed filter (4) through a backwash pipe (19); a mixed solution of sodium acetate and methanol with a molar ratio thereof of 3:2 is filled in the first chemical storage tank (14); and a rhamnolipid solution with a mass concentration of 30-40% is filled in the second chemical storage tank (15).

2. The apparatus for relieving surface-layer clogging of a denitrification deep-bed filter of claim 1, wherein a first outlet of backwash water (10) and a second outlet of backwash water (11) are arranged above the first filling material layer (6) and the second filling material layer (7) respectively.

3. A method for running the apparatus for relieving surface-layer clogging of a denitrification deep-bed filter according to claim 2, comprising steps of:
  A) introducing sewage to be treated from a raw-water inlet (1) into a settling tank (2) to perform preliminary sedimentation, then introducing into an adjusting tank (3), and opening a first control valve (16) to add a mixed solution of sodium acetate and methanol into the adjusting tank (3) through a first chemical storage tank (14) in such a manner that the COD/N of the inlet water is equal to 3-5;
  B) passing a water flow into a first filling material layer (6) within a denitrification deep-bed filter (4) via a uniform water distributor (9), such that suspended solids with large particle sizes in the inlet water is removed under the absorption and interception actions of zeolite, and meanwhile a small amount of ammonia nitrogen contained in the inlet water is also removed through absorption, and thus the suspended solids with large particle sizes and parts of DO are removed;
  C) continually passing the water flow through a second filling material layer (7) within the denitrification deep-bed filter (4), wherein the water flow is absorbed and intercepted by the quartz sand filling material of the second filling material layer (7), and SS and nitrate are removed through the denitrification action of denitrifying bacteria, the denitrifying bacteria reduce nitrate and nitrite into nitrogen gas by using a carbon source contained in the inlet water, and the nitrogen gas is collected by a gas collecting device (12) and discharged from a gas outlet (13); adjusting a first control valve (16) to reduce the flow rate of the mixed solution of sodium acetate and methanol to 30-45% of the initial flow rate when the filtration rate of the filter is reduced and become stable; and then adjusting the flow rate via the first control valve (16) when the filtration rate of the filter become lower than 50-65% of the designed filtration rate;
  D) continually passing the water flow through an electrodialysis membrane (8), wherein the electrodialysis membrane (8) absorbs water and swells after an external power supply is applied thereto, so as to absorb and separate electrolytes contained in the water;
  E) opening a second control valve (17) and adding a rhamnolipid solution in such a manner that the mass concentration of rhamnolipid within the inlet water is 60-80 mg/L, and running the denitrification deep-bed filter to perform dispersion and separation of the substances intercepted in the surface layer of the filtering material within the filter; wherein the running time of this step is determined by the filtering-rate recovery time of the filter, and adjusting the flow rate of the second control valve (17) when the filtration rate of the filter is increased to a stable level;
  F) adjusting the second control valve (17) in such a manner that the flow rate of the rhamnolipid solution become 30-50% of the flow rate of step C when the filtration rate of the filter is increased and become stable, adjusting the first control valve (16) in such a manner that the flow rate of the mixed solution of sodium acetate and methanol become 60-70% of the flow rate of step A, and then continually running the filter to complete the dispersion of the substances intercepted in the surface layer of the filtering material within the filter; and then adjusting the flow rate of the first control valve (16) in such a manner that the COD of the outlet water of the filter is less than or equal to the COD of the outlet water before adjusting the first control valve (16); and
  G) starting a backwash pump (20) when the concentration of suspended solids in the outlet water is greater than 10 mg/L or the filtration rate is less than 60% of the designed filtration rate, wherein a portion of water contained in a clean water tank (5) is used for backwash, and the backwash is divided into two phases, wherein in the first phase of backwashing the second filling material layer (7), a first outlet of backwash water (10) is closed and a second outlet of backwash water (11) is open, such that the backwash water flows out from the second outlet of backwash water (11); and in the second phase of backwashing the first filling material layer (6), the second outlet of backwash water (11) is closed and the first outlet of backwash water (10) is open, such that the backwash water flows out from the first outlet of backwash water (10).

4. The apparatus for relieving surface-layer clogging of a denitrification deep-bed filter of claim 1, wherein the uniform water distributor (9) consists of fractionation water distributing devices respectively comprising a water inlet manifold, a main pipe, a branch pipe and a water distributor having uniformly-arranged water distributing holes.

5. A method for running the apparatus for relieving surface-layer clogging of a denitrification deep-bed filter according to claim 4, comprising steps of:
  A) introducing sewage to be treated from a raw-water inlet (1) into a settling tank (2) to perform preliminary sedimentation, then introducing into an adjusting tank (3), and opening a first control valve (16) to add a mixed solution of sodium acetate and methanol into the adjusting tank (3) through a first chemical storage tank (14) in such a manner that the COD/N of the inlet water is equal to 3-5;
  B) passing a water flow into a first filling material layer (6) within a denitrification deep-bed filter (4) via a uniform water distributor (9), such that suspended solids with large particle sizes in the inlet water is removed under the absorption and interception actions of zeolite, and meanwhile a small amount of ammonia nitrogen contained in the inlet water is also removed through absorption, and thus the suspended solids with large particle sizes and parts of DO are removed;
  C) continually passing the water flow through a second filling material layer (7) within the denitrification deep-bed filter (4), wherein the water flow is absorbed and intercepted by the quartz sand filling material of the second filling material layer (7), and SS and nitrate are removed through the denitrification action of denitrifying bacteria, the denitrifying bacteria reduce nitrate and nitrite into nitrogen gas by using a carbon source contained in the inlet water, and the nitrogen gas is collected by a gas collecting device (12) and discharged from a gas outlet (13); adjusting a first control valve (16) to reduce the flow rate of the mixed solution of sodium acetate and methanol to 30-45% of the initial flow rate when the filtration rate of the filter is reduced and become stable; and then adjusting the flow rate via the first control valve (16) when the filtration rate of the filter become lower than 50-65% of the designed filtration rate;

D) continually passing the water flow through an electrodialysis membrane (8), wherein the electrodialysis membrane (8) absorbs water and swells after an external power supply is applied thereto, so as to absorb and separate electrolytes contained in the water;

E) opening a second control valve (17) and adding a rhamnolipid solution in such a manner that the mass concentration of rhamnolipid within the inlet water is 60-80 mg/L, and running the denitrification deep-bed filter to perform dispersion and separation of the substances intercepted in the surface layer of the filtering material within the filter; wherein the running time of this step is determined by the filtering-rate recovery time of the filter, and adjusting the flow rate of the second control valve (17) when the filtration rate of the filter is increased to a stable level;

F) adjusting the second control valve (17) in such a manner that the flow rate of the rhamnolipid solution become 30-50% of the flow rate of step C when the filtration rate of the filter is increased and become stable, adjusting the first control valve (16) in such a manner that the flow rate of the mixed solution of sodium acetate and methanol become 60-70% of the flow rate of step A, and then continually running the filter to complete the dispersion of the substances intercepted in the surface layer of the filtering material within the filter; and then adjusting the flow rate of the first control valve (16) in such a manner that the COD of the outlet water of the filter is less than or equal to the COD of the outlet water before adjusting the first control valve (16); and G) starting a backwash pump (20) when the concentration of suspended solids in the outlet water is greater than 10 mg/L or the filtration rate is less than 60% of the designed filtration rate, wherein a portion of water contained in a clean water tank (5) is used for backwash, and the backwash is divided into two phases, wherein in the first phase of backwashing the second filling material layer (7), a first outlet of backwash water (10) is closed and a second outlet of backwash water (11) is open, such that the backwash water flows out from the second outlet of backwash water (11); and in the second phase of backwashing the first filling material layer (6), the second outlet of backwash water (11) is closed and the first outlet of backwash water (10) is open, such that the backwash water flows out from the first outlet of backwash water (10).

6. The apparatus for relieving surface-layer clogging of a denitrification deep-bed filter of claim 1, wherein the first filling material layer (6) is zeolite with a selected particle size of 7-8 mm and a density of 2.0-2.4 g/cm$^3$.

7. A method for running the apparatus for relieving surface-layer clogging of a denitrification deep-bed filter according to claim 6, comprising steps of:

A) introducing sewage to be treated from a raw-water inlet (1) into a settling tank (2) to perform preliminary sedimentation, then introducing into an adjusting tank (3), and opening a first control valve (16) to add a mixed solution of sodium acetate and methanol into the adjusting tank (3) through a first chemical storage tank (14) in such a manner that the COD/N of the inlet water is equal to 3-5;

B) passing a water flow into a first filling material layer (6) within a denitrification deep-bed filter (4) via a uniform water distributor (9), such that suspended solids with large particle sizes in the inlet water is removed under the absorption and interception actions of zeolite, and meanwhile a small amount of ammonia nitrogen contained in the inlet water is also removed through absorption, and thus the suspended solids with large particle sizes and parts of DO are removed;

C) continually passing the water flow through a second filling material layer (7) within the denitrification deep-bed filter (4), wherein the water flow is absorbed and intercepted by the quartz sand filling material of the second filling material layer (7), and SS and nitrate are removed through the denitrification action of denitrifying bacteria, the denitrifying bacteria reduce nitrate and nitrite into nitrogen gas by using a carbon source contained in the inlet water, and the nitrogen gas is collected by a gas collecting device (12) and discharged from a gas outlet (13); adjusting a first control valve (16) to reduce the flow rate of the mixed solution of sodium acetate and methanol to 30-45% of the initial flow rate when the filtration rate of the filter is reduced and become stable; and then adjusting the flow rate via the first control valve (16) when the filtration rate of the filter become lower than 50-65% of the designed filtration rate;

D) continually passing the water flow through an electrodialysis membrane (8), wherein the electrodialysis membrane (8) absorbs water and swells after an external power supply is applied thereto, so as to absorb and separate electrolytes contained in the water;

E) opening a second control valve (17) and adding a rhamnolipid solution in such a manner that the mass concentration of rhamnolipid within the inlet water is 60-80 mg/L, and running the denitrification deep-bed filter to perform dispersion and separation of the substances intercepted in the surface layer of the filtering material within the filter; wherein the running time of this step is determined by the filtering-rate recovery time of the filter, and adjusting the flow rate of the second control valve (17) when the filtration rate of the filter is increased to a stable level;

F) adjusting the second control valve (17) in such a manner that the flow rate of the rhamnolipid solution become 30-50% of the flow rate of step C when the filtration rate of the filter is increased and become stable, adjusting the first control valve (16) in such a manner that the flow rate of the mixed solution of sodium acetate and methanol become 60-70% of the flow rate of step A, and then continually running the filter to complete the dispersion of the substances intercepted in the surface layer of the filtering material within the filter; and then adjusting the flow rate of the first control valve (16) in such a manner that the COD of the outlet water of the filter is less than or equal to the COD of the outlet water before adjusting the first control valve (16); and G) starting a backwash pump (20) when the concentration of suspended solids in the outlet water is greater than 10 mg/L or the filtration rate is less than 60% of the designed filtration rate, wherein a portion of water contained in a clean water tank (5) is used for backwash, and the backwash is divided into two phases, wherein in the first phase of backwashing the second filling material layer (7), a first outlet of backwash water (10) is closed and a second outlet of backwash water (11) is open, such that the backwash water flows out from the second outlet of backwash water (11); and in the second phase of backwashing the first filling material layer (6), the second outlet of backwash water (11) is closed and the first outlet of backwash water (10) is open, such that the backwash water flows out from the first outlet of backwash water (10).

8. The apparatus for relieving surface-layer clogging of a denitrification deep-bed filter of claim 1, wherein the second filling material layer (7) consists of quartz sand with a selected particle size of 2-4 mm.

9. A method for running the apparatus for relieving surface-layer clogging of a denitrification deep-bed filter according to claim 8, comprising steps of:
   A) introducing sewage to be treated from a raw-water inlet (1) into a settling tank (2) to perform preliminary sedimentation, then introducing into an adjusting tank (3), and opening a first control valve (16) to add a mixed solution of sodium acetate and methanol into the adjusting tank (3) through a first chemical storage tank (14) in such a manner that the COD/N of the inlet water is equal to 3-5;
   B) passing a water flow into a first filling material layer (6) within a denitrification deep-bed filter (4) via a uniform water distributor (9), such that suspended solids with large particle sizes in the inlet water is removed under the absorption and interception actions of zeolite, and meanwhile a small amount of ammonia nitrogen contained in the inlet water is also removed through absorption, and thus the suspended solids with large particle sizes and parts of DO are removed;
   C) continually passing the water flow through a second filling material layer (7) within the denitrification deep-bed filter (4), wherein the water flow is absorbed and intercepted by the quartz sand filling material of the second filling material layer (7), and SS and nitrate are removed through the denitrification action of denitrifying bacteria, the denitrifying bacteria reduce nitrate and nitrite into nitrogen gas by using a carbon source contained in the inlet water, and the nitrogen gas is collected by a gas collecting device (12) and discharged from a gas outlet (13); adjusting a first control valve (16) to reduce the flow rate of the mixed solution of sodium acetate and methanol to 30-45% of the initial flow rate when the filtration rate of the filter is reduced and become stable; and then adjusting the flow rate via the first control valve (16) when the filtration rate of the filter become lower than 50-65% of the designed filtration rate;
   D) continually passing the water flow through an electrodialysis membrane (8), wherein the electrodialysis membrane (8) absorbs water and swells after an external power supply is applied thereto, so as to absorb and separate electrolytes contained in the water;
   E) opening a second control valve (17) and adding a rhamnolipid solution in such a manner that the mass concentration of rhamnolipid within the inlet water is 60-80 mg/L, and running the denitrification deep-bed filter to perform dispersion and separation of the substances intercepted in the surface layer of the filtering material within the filter; wherein the running time of this step is determined by the filtering-rate recovery time of the filter, and adjusting the flow rate of the second control valve (17) when the filtration rate of the filter is increased to a stable level;
   F) adjusting the second control valve (17) in such a manner that the flow rate of the rhamnolipid solution become 30-50% of the flow rate of step C when the filtration rate of the filter is increased and become stable, adjusting the first control valve (16) in such a manner that the flow rate of the mixed solution of sodium acetate and methanol become 60-70% of the flow rate of step A, and then continually running the filter to complete the dispersion of the substances intercepted in the surface layer of the filtering material within the filter; and then adjusting the flow rate of the first control valve (16) in such a manner that the COD of the outlet water of the filter is less than or equal to the COD of the outlet water before adjusting the first control valve (16); and
   G) starting a backwash pump (20) when the concentration of suspended solids in the outlet water is greater than 10 mg/L or the filtration rate is less than 60% of the designed filtration rate, wherein a portion of water contained in a clean water tank (5) is used for backwash, and the backwash is divided into two phases, wherein in the first phase of backwashing the second filling material layer (7), a first outlet of backwash water (10) is closed and a second outlet of backwash water (11) is open, such that the backwash water flows out from the second outlet of backwash water (11); and in the second phase of backwashing the first filling material layer (6), the second outlet of backwash water (11) is closed and the first outlet of backwash water (10) is open, such that the backwash water flows out from the first outlet of backwash water (10).

10. The apparatus for relieving surface-layer clogging of a denitrification deep-bed filter of claim 1, wherein the electrodialysis membrane (8) consists of an anion exchange membrane and cation exchange membrane, the anion exchange membrane comprises the following components by weight: 60-80 parts of anion-exchange resin powder, 14-30 parts of adhesive, 1.1-2.6 parts of releasing agent, 0.05-0.1 parts of activating agent; the cation exchange membrane mainly comprises the following components by weight: 55-72 parts of cation-exchange resin powder, and the remaining components are the same as those of the anion exchange membrane.

11. A method for running the apparatus for relieving surface-layer clogging of a denitrification deep-bed filter according to claim 10, comprising steps of:
   A) introducing sewage to be treated from a raw-water inlet (1) into a settling tank (2) to perform preliminary sedimentation, then introducing into an adjusting tank (3), and opening a first control valve (16) to add a mixed solution of sodium acetate and methanol into the adjusting tank (3) through a first chemical storage tank (14) in such a manner that the COD/N of the inlet water is equal to 3-5;
   B) passing a water flow into a first filling material layer (6) within a denitrification deep-bed filter (4) via a uniform water distributor (9), such that suspended solids with large particle sizes in the inlet water is removed under the absorption and interception actions of zeolite, and meanwhile a small amount of ammonia nitrogen contained in the inlet water is also removed through absorption, and thus the suspended solids with large particle sizes and parts of DO are removed;

C) continually passing the water flow through a second filling material layer (7) within the denitrification deep-bed filter (4), wherein the water flow is absorbed and intercepted by the quartz sand filling material of the second filling material layer (7), and SS and nitrate are removed through the denitrification action of denitrifying bacteria, the denitrifying bacteria reduce nitrate and nitrite into nitrogen gas by using a carbon source contained in the inlet water, and the nitrogen gas is collected by a gas collecting device (12) and discharged from a gas outlet (13); adjusting a first control valve (16) to reduce the flow rate of the mixed solution of sodium acetate and methanol to 30-45% of the initial flow rate when the filtration rate of the filter is reduced and become stable; and then adjusting the flow rate via the first control valve (16) when the filtration rate of the filter become lower than 50-65% of the designed filtration rate;

D) continually passing the water flow through an electrodialysis membrane (8), wherein the electrodialysis membrane (8) absorbs water and swells after an external power supply is applied thereto, so as to absorb and separate electrolytes contained in the water;

E) opening a second control valve (17) and adding a rhamnolipid solution in such a manner that the mass concentration of rhamnolipid within the inlet water is 60-80 mg/L, and running the denitrification deep-bed filter to perform dispersion and separation of the substances intercepted in the surface layer of the filtering material within the filter; wherein the running time of this step is determined by the filtering-rate recovery time of the filter, and adjusting the flow rate of the second control valve (17) when the filtration rate of the filter is increased to a stable level;

F) adjusting the second control valve (17) in such a manner that the flow rate of the rhamnolipid solution become 30-50% of the flow rate of step C when the filtration rate of the filter is increased and become stable, adjusting the first control valve (16) in such a manner that the flow rate of the mixed solution of sodium acetate and methanol become 60-70% of the flow rate of step A, and then continually running the filter to complete the dispersion of the substances intercepted in the surface layer of the filtering material within the filter; and then adjusting the flow rate of the first control valve (16) in such a manner that the COD of the outlet water of the filter is less than or equal to the COD of the outlet water before adjusting the first control valve (16); and G) starting a backwash pump (20) when the concentration of suspended solids in the outlet water is greater than 10 mg/L or the filtration rate is less than 60% of the designed filtration rate, wherein a portion of water contained in a clean water tank (5) is used for backwash, and the backwash is divided into two phases, wherein in the first phase of backwashing the second filling material layer (7), a first outlet of backwash water (10) is closed and a second outlet of backwash water (11) is open, such that the backwash water flows out from the second outlet of backwash water (11); and in the second phase of backwashing the first filling material layer (6), the second outlet of backwash water (11) is closed and the first outlet of backwash water (10) is open, such that the backwash water flows out from the first outlet of backwash water (10).

12. A method for running the apparatus for relieving surface-layer clogging of a denitrification deep-bed filter according to claim 1, comprising steps of:

A) introducing sewage to be treated from a raw-water inlet (1) into a settling tank (2) to perform preliminary sedimentation, then introducing into an adjusting tank (3), and opening a first control valve (16) to add a mixed solution of sodium acetate and methanol into the adjusting tank (3) through a first chemical storage tank (14) in such a manner that the COD/N of the inlet water is equal to 3-5;

B) passing a water flow into a first filling material layer (6) within a denitrification deep-bed filter (4) via a uniform water distributor (9), such that suspended solids with large particle sizes in the inlet water is removed under the absorption and interception actions of zeolite, and meanwhile a small amount of ammonia nitrogen contained in the inlet water is also removed through absorption, and thus the suspended solids with large particle sizes and parts of DO are removed;

C) continually passing the water flow through a second filling material layer (7) within the denitrification deep-bed filter (4), wherein the water flow is absorbed and intercepted by the quartz sand filling material of the second filling material layer (7), and SS and nitrate are removed through the denitrification action of denitrifying bacteria, the denitrifying bacteria reduce nitrate and nitrite into nitrogen gas by using a carbon source contained in the inlet water, and the nitrogen gas is collected by a gas collecting device (12) and discharged from a gas outlet (13); adjusting a first control valve (16) to reduce the flow rate of the mixed solution of sodium acetate and methanol to 30-45% of the initial flow rate when the filtration rate of the filter is reduced and become stable; and then adjusting the flow rate via the first control valve (16) when the filtration rate of the filter become lower than 50-65% of the designed filtration rate;

D) continually passing the water flow through an electrodialysis membrane (8), wherein the electrodialysis membrane (8) absorbs water and swells after an external power supply is applied thereto, so as to absorb and separate electrolytes contained in the water;

E) opening a second control valve (17) and adding a rhamnolipid solution in such a manner that the mass concentration of rhamnolipid within the inlet water is 60-80 mg/L, and running the denitrification deep-bed filter to perform dispersion and separation of the substances intercepted in the surface layer of the filtering material within the filter; wherein the running time of this step is determined by the filtering-rate recovery time of the filter, and adjusting the flow rate of the second control valve (17) when the filtration rate of the filter is increased to a stable level;

F) adjusting the second control valve (17) in such a manner that the flow rate of the rhamnolipid solution become 30-50% of the flow rate of step C when the filtration rate of the filter is increased and become stable, adjusting the first control valve (16) in such a manner that the flow rate of the mixed solution of sodium acetate and methanol become 60-70% of the flow rate of step A, and then continually running the filter to complete the dispersion of the substances intercepted in the surface layer of the filtering material within the filter; and then adjusting the flow rate of the first control valve (16) in such a manner that the COD of the outlet water of the filter is less than or equal to the COD of the outlet water before adjusting the first control valve (16); and G) starting a backwash pump (20) when the concentration of suspended solids in the outlet water is greater than 10 mg/L or the filtration rate is less than 60% of the designed filtration rate, wherein a portion of water contained in a clean water tank (5) is used for backwash, and the backwash is divided into two phases, wherein in the first phase of backwashing the second filling material layer (7), a first outlet of backwash water (10) is closed and a second outlet of backwash water (11) is open, such that the backwash water flows out from the second outlet of backwash water (11); and in the second phase of backwashing the first filling material layer (6), the second outlet of backwash water (11) is closed and the first outlet of backwash water (10) is open, such that the backwash water flows out from the first outlet of backwash water (10).

\* \* \* \* \*